United States Patent [19]
Amirsakis

[11] Patent Number: 5,891,578
[45] Date of Patent: Apr. 6, 1999

[54] POLYURETHANE BINDER FOR A MAGNETIC RECORDING MEDIUM

[75] Inventor: Charles J. Amirsakis, Lake Geneva, Wis.

[73] Assignee: Morton International, Inc., Chicago, Ill.

[21] Appl. No.: 966,690

[22] Filed: Nov. 10, 1997

Related U.S. Application Data

[62] Division of Ser. No. 816,467, Mar. 13, 1997, Pat. No. 5,747,630.

[51] Int. Cl.$^6$ ........................................................ B05D 5/12
[52] U.S. Cl. ..................................... 428/423.7; 428/424.6; 428/424.8; 428/425.8
[58] Field of Search ..................................... 427/128, 127; 428/423.1, 423.7, 424.6, 424.8, 425.8

[56] References Cited

U.S. PATENT DOCUMENTS

| | | | |
|---|---|---|---|
| 3,257,479 | 6/1966 | Irani et al. | 260/932 |
| 3,479,310 | 11/1969 | Dieterich et al. . | |
| 3,870,684 | 3/1975 | Witt et al. . | |
| 3,873,603 | 3/1975 | Schmadel | 260/481 R |
| 4,092,286 | 5/1978 | Noll et al. . | |
| 4,108,814 | 8/1978 | Reiff et al. | 528/71 |
| 4,237,264 | 12/1980 | Noll et al. | 528/71 |
| 4,238,378 | 12/1980 | Markusch et al. | 528/71 |
| 4,322,324 | 3/1982 | Mizuguchi et al. | 528/290 |
| 4,408,008 | 10/1983 | Markusch | 524/591 |
| 4,568,611 | 2/1986 | Amirsakis et al. | 428/425.9 |
| 4,784,907 | 11/1988 | Matsufuji et al. | 428/328 |
| 4,784,914 | 11/1988 | Matsufuji et al. | 428/418 |
| 4,842,942 | 6/1989 | Yatsuka et al. | 428/425.9 |
| 5,009,960 | 4/1991 | Yatsuka et al. | 428/423.1 |
| 5,034,271 | 7/1991 | Miyoshi et al. | 428/323 |
| 5,061,564 | 10/1991 | Ohya et al. | 428/409 |
| 5,084,335 | 1/1992 | Nakano et al. | 428/323 |
| 5,089,344 | 2/1992 | Tamazaki et al. | 428/694 |
| 5,094,904 | 3/1992 | Kawakami et al. | 428/212 |
| 5,158,830 | 10/1992 | Yasuda et al. | 428/425.9 |
| 5,242,752 | 9/1993 | Isobe et al. | 428/329 |
| 5,250,354 | 10/1993 | Ejiri | 428/336 |
| 5,273,826 | 12/1993 | Yasuda et al. | 428/423.1 |
| 5,371,166 | 12/1994 | Farkas et al. | 528/71 |

FOREIGN PATENT DOCUMENTS 0143337  6/1985  European Pat. Off. .

*Primary Examiner*—Erma Cameron
*Attorney, Agent, or Firm*—Robert M. Didrick; Gerald K. White

[57] ABSTRACT

A polyurethane prepared from a functionalized polyol has superior hydrolytic stability and dispersive capacity which makes it useful as a binder for magnetic particles in a magnetic recording medium. The functionalized polyol may be one of the group consisting of a polyesterdiol, a polyetherdiol, a polycaprolactone diol and a polycarbonate diol, each of which incorporates a functional group having the formula:

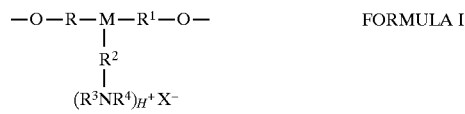

FORMULA I wherein M is a methylene group or nitrogen, R and $R^1$ are the same or different alkylene groups having from 1 to 7 carbon atoms, $R^2$ is an alkylene group having from 1 to 7 carbon atoms, and $R^3$ and $R^4$ are the same or different alkyl groups having from 1 to 7 carbon atoms, and X is an anion of a Brønsted acid in an amount such that the polyurethane contains from about 8 to about 32 gram moles of the functional group per $1 \times 10^6$ grams of the polyurethane. The polyurethane may be made by heating a mixture of a Brønsted acid salt of a carboxylic acid terminated aminoester, a stoichiometric excess of a glycol, and a dicarboxylic acid to make a functionalized polyesterdiol and curing a mixture of said polyesterdiol and a diisocyanate.

9 Claims, No Drawings

POLYURETHANE BINDER FOR A MAGNETIC RECORDING MEDIUM

This is a divisional of application Ser. No. 08/816,467 filed on Mar. 13, 1997 now U.S. Pat. No. 5,747,630.

BACKGROUND OF THE INVENTION

This invention relates to magnetic recording media such as tapes and discs which are obtained by applying a magnetic coating on a non-magnetic support.

General purpose magnetic tapes and discs are produced by coating a polyethylene terephthalate film with a magnetic material prepared by dispersing ferromagnetic particles about 1 micron long in a resinous binder. The resinous binder plays a very important role in providing excellent dispersibility, filling efficiency, and orientation of magnetic particles as well as imparting excellent durability, abrasion resistance, heat resistance and smoothness to the magnetic coating and adhesion thereof to the support.

Examples of resinous binders conventionally used include vinyl chloride/vinyl acetate copolymers, vinyl chloride/vinyl acetate/vinyl alcohol copolymers, vinyl chloride/vinylidene chloride copolymers, polyurethane resins, polyester resins, acrylonitrile/butadiene copolymers, nitrocellulose, cellulose acetate butyrate, epoxy resins, and acrylic resins. Of these resins, conventional polyurethane resins have excellent toughness and abrasion resistance compared to other resins but often are inferior in properties such as blocking resistance, heat resistance, and running stability. For these reasons, a mixed system of polyurethane resins with nitrocellulose or vinyl chloride/vinyl acetate copolymers is often used. The durability, heat resistance, and adhesive properties of polyurethanes may be improved by curing with a polyisocyanate at from about room temperature to about 40° C. or higher over a long period of time after the application and drying of the magnetic coating composition.

A magnetic recording layer having highly improved strength and other properties employs a binder resin comprising both a vinyl chloride copolymer (e.g., a vinyl chloride/vinyl acetate/maleic anhydride copolymer) and a polyurethane resin. Japanese Patent Publication No. 59-8127 teaches the incorporation of a polar group into one or both of the constituent resins to enhance the dispersibility of ferromagnetic powders in such a binder.

The durability and abrasion resistance of conventional resinous binders are still insufficient for use in video tapes, computer tapes, and floppy discs, all of which are required to have high performance and high reliability. Demand for high density and high quality recording media is increasing while smoothness is still desired. As the required smoothness increases, the running durability has suffered and resinous binders with higher durability must be developed. To do so, it has been proposed to introduce multifunctional components into the polyurethanes which are reactive with the polyisocyanate; trimethylol propane and diethanolamine exemplify such components. A serious drawback to this approach is that the dispersibility of the magnetic particles often decreases as the durability improves. The high recording density and high quality required for magnetic media have been supplied in recent years by fine magnetic particles of metals and barium ferrite but durability and dispersibility are still required of resinous binders for such particles.

A method for improving the dispersibility of the particles by the incorporation of metal sulfonate groups or metal salts of acidic phosphorus compounds is taught in Japanese Patent Publication Nos. 57-3134 and 58-41564 and in Japanese Patent Publication (Kokai) No. 61-48122. More recently, Yatsuka et al has taught in U.S. Pat. No. 5,009,960 that the presence of such multifunctional components in the resin containing the metal sulfonate group or metal salt of an acidic phosphorus compound for the purpose of improving the durability of such coating still results in a lesser dispersibility. Yatsuka et al further taught that the incorporation of a bicyclic amide acetal into the polyurethane resin will overcome the deficiencies of the prior art. A preferred polyurethane contains, as a functional group, a metal salt of an acidic phosphorus compound.

In U.S. Pat. No. 5,371,166, Farkas et al teach that the dispersibility and hydrolytic stability of a polyurethane are improved by adding an aminodiol and a Brønsted acid to a chain extender and/or hydroxy-terminated polyol which are to be reacted with a diisocyanate to make the polyurethane. The reaction product of the aminodiol and Brønsted acid thus does not become a part of the polyol but becomes instead part of the hard segment of the polyurethane. Phosphoric acid, which gives an insoluble product, is not named as a Brønsted acid.

SUMMARY OF THE INVENTION

In view of this, the present inventor has studied extensively with the object of improving the dispersibility and adsorptivity of magnetic particles in the resinous binder and improving the durability of the magnetic recording medium.

It is an object of this invention, therefore, to provide a durable magnetic recording composition which has excellent dispersibility of ferromagnetic particles which may be free of vinyl chloride polymers and copolymers containing polar groups.

It is a related object of this invention to provide a magnetic recording composition which has excellent hydrolytic stability.

It is a further object of this invention to provide a cationic magnetic coating composition having an attenuated viscosity to facilitate the manufacture of a magnetic recording tape.

It is related object of this invention to provide a magnetic recording medium having a very smooth layer of said recording composition on its surface.

It is another related object of this invention to provide a magnetic recording medium having an improved signal-generating capacity.

It is another object of this invention to provide a method for making said resinous binder.

These and other objects of the invention which will become apparent from the following description are achieved by a polyurethane which incorporates a functionalized polyol selected from the group consisting of a polyesterdiol, a polycaprolactonediol, a polycarbonatediol, and mixtures thereof, and which incorporates a functional group having the formula:

$$-O-R-M-R^1-O- \quad \text{FORMULA I}$$
$$|$$
$$R^2$$
$$|$$
$$(R^3NR^4)_H{}^+ X^-$$

wherein M is a methylene group or nitrogen, R and $R^1$ are the same or different alkylene groups having from 1 to 7 carbon atoms, $R^2$ is an alkylene group having from 1 to 7 carbon atoms, and $R^3$ and $R^4$ are the same or different alkyl groups having from 1 to 7 carbon atoms, and X is an anion of a Brønsted acid in an amount such that the polyurethane contains from about 8 to about 32 gram moles of the functional group per $1 \times 10^6$ grams of the polyurethane.

DETAILED DESCRIPTION OF THE INVENTION

The magnetic coating composition of this invention may contain other binder resins such as those mentioned hereinabove. As used herein, the term functionalized polyol means a hydroxyl terminated polyester, polyether, polycaprolactaone, and polycarbonate containing the functional group of Formula I and used as an intermediate in the preparation of binder resin of this invention.

The functionalized polyesterdiols used in the preparation of a polyurethane are preferably linear and have a weight average molecular weight of from about 500 to about 1000, preferably from about 500 to about 700. They may be produced by a conventional procedure in which one or more dicarboxylic acids and one or more glycols are heated in the presence of an acid catalyst until the acid number is reduced to about 30 or less, preferably less than 1, more preferably less than 0.8. The glycol to acid mole ratio is preferably greater than one so as to obtain linear chains having a preponderance of terminal hydroxyl groups. The hydroxyl number may be from about 50 to about 200 or more. Transesterification of a given dicarboxylic acid ester by reaction with one or more of such glycols is also suitable.

Preferably, the aminodiol is reacted with a stoichiometric excess of the dicarboxylic acid first to obtain a carboxylic acid terminated ester. After reaction of the carboxylic acid terminated aminoester with the Brønsted acid, a stoichiometric excess of one or more of the other ester forming glycols, with respect to the amount of unreacted dicarboxylic acid remaining, is added to the reaction mixture before continuing the esterification as outlined above. A much shorter reaction time is achieved in comparison with the procedure wherein the mixture of glycols, aminodiol, and dicarboxylic acid is reacted.

The ester-forming glycols in this invention include the tertiary aminodiols from which the cations of the functional groups of Formula I are derived. Examples of aminodiols useful in forming the functional modifier include: N,N-dimethyl-N',N'-di-(2-hydroxypropyl)-1,3 propane diamine, 3-diethylamino-1,2-propanediol (DEAPD), 3-dimethylamino-1,2-propanediol, 3-dipropylamino- 1,2-propanediol; 3-diisopropylamino-1,2-propanediol; 2-[4-(dimethylamino)butyl]-1,3-propanediol; 3-dimethyl-1,6-hexanediol; and 1-(dimethylamino)-2,2-(bis(hydroxymethyl)propane; as well as any combinations thereof.

Other ester-forming glycols may be aliphatic, cycloaliphatic, aromatic or mixtures thereof. Examples of the glycol component include alkylene glycols having from 2 to 10 carbon atoms as exemplified by ethylene glycol, 1,2-propanediol, 1,4-butanediol, 2,6-hexamethylenediol, and mixtures thereof. ethylene glycol, propylene glycol, 1,3-propanediol, 1,4-butanediol, 1,5-pentanediol, 1,6-hexanediol, neopentyl glycol, diethylene glycol, dipropylene glycol, 2-methyl-1,3-propane diol; 2-butyl-2-ethyl-1,3-propane diol; 2,2,4-trimethyl-1,3-pentanediol; cyclohexanedimethanol, ethylene oxide and propylene oxide adducts of bisphenol A, ethylene oxide and propylene oxide adducts of hydrogenated bisphenol A, polyethylene glycol, polypropylene glycol, polytetramethylene glycol, and the like.

The dicarboxylic acid component of the polyesterdiol may be aliphatic, cycloaliphatic, aromatic or mixtures thereof. Aromatic dicarboxylic acids are exemplified by terephthalic, isophthalic, orthophthalic or its anhydride, 1,5-naphthalic acid, oxycarboxylic acids such as p-oxybenzoic acid, and p-(hydroxyethoxy)benzoic acid. Suitable aliphatic dicarboxylic acids include succinic, adipic, azelaic, sebacic, and dodecanedioc acid, and alicyclic dicarboxylic acids such as cyclohexanedicarboxylic acid, hydrogenated 2,6-naphthalenedicarboxylic acid and the like. An anhydride may be used in place of or with the acid.

The polycaprolactonediols used as intermediates in the preparation of a functionalized polyurethane of this invention, are made by the reaction of a caprolactone of one of the above-described functionalized polyesterdiols and a bifunctional compound having two reactive sites capable of opening the lactone ring, also exemplify functionalized polyols suitable for this invention. The bifunctional compounds may be represented by the formula HY—R'—YH wherein R' is an aliphatic, cycloaliphatic, aromatic, or heterocyclic radical and Y is O, NH, or NR" where R" is alkyl, aryl, aralkyl, or cycloalkyl. Diols, diamines, and aminoalcohols are among the preferred compounds for this purpose. The diols suitable for opening the lactone ring include the aminodiols exemplified above and alkylene glycols having from 2 to 10 carbon atoms as exemplified by ethylene glycol, 1,2-propane-diol, 1,4-butanediol, 2,6-hexamethylenediol, and mixtures thereof. The lactones are polymerized readily by heating them with the bifunctional compounds to a temperature of from about 100° to about 200° C. Suitably, the polycaprolactone diols have a weight average molecular weight of from about 500 to about 1000, preferably from about 500 to about 700.

Functionalized polycarbonatediols used as intermediates in this invention are made from diols such as those set forth hereinabove, including the aminodiols, by transesterification with low molecular weight carbonates such as diethyl or diphenyl carbonate or mixtures thereof, followed by reaction with a Brønsted acid. Generally, the polycarbonatediols have a weight average molecular weight of from about 500 to about 1000, preferably from about 500 to about 700.

The functionalized polyether diols are derived from a diol having a total of from 2 to 15 carbon atoms, including an aminodiol as described above, by reaction with an ether comprising an alkylene oxide having from 2 to 6 carbon atoms, typically ethylene oxide or propylene oxide, or mixtures thereof. For example, hydroxyl functional polyethers can be produced by first reacting propylene glycol with propylene oxide followed by subsequent reaction with ethylene oxide. The amino group-containing polyol is then reacted with a Brønsted acid. Primary hydroxyl groups resulting from ethylene oxide are more reactive than secondary hydroxyl groups and thus are preferred. The various polyether intermediates generally have an average molecular weight, as determined by assay of the terminal functional groups, of from about 500 to about 1000. A preferred average molecular weight is in the range of about 500 to about 700.

Phosphoric acid is the preferred Brønsted acid for the purposes of this invention. Other useful Brønsted acids include monoalkyl-diacid phosphates, phosphonic acids, phosphinic acids, and sulfonic acids. Examples of phosphonic acids include but are not limited to: methylphosphonic acid; ethylphosphonic acid; propylphosphonic acid; butylphosphonic acid; t-butylphosphonic acid; methylenediphosphonic acid; 2-chloroethylphosphonic acid; phenyl phosphonic acid; phosphonoacetic acid; and phosphonopropionic acid as well as any combination thereof. Illustrative examples of phosphinic acids include: phenylphosphinic acid; diphenylphosphinic acid; dimethylphosphinic acid; and bis(4-methoxyphenyl) phosphinic acid. Possible sulfonic acids to be used include: methanesulfonic acid; ethanesulfonic acid; propanesulfonic acid; sulfoacetic acid; sulfosuccinic acid; benzenesulfonic acid; 4-ethylbenzenesulfonic acid; 4-hydroxybenzenesulfonic acid; 4-chlorobenzenesulfonic acid; p-toluenesulfonic acid; 4-sulfophthalic acid; 1-naphthalenesulfonic acid; 2-naphthalenesulfonic acid; 3-sulfobenzoic acid; 4-sulfobenzoic acid; and 5-sulfoisophthalic acid as well as any combinations thereof. Butyl diacid phosphate is representative of the useful monoalkyl phosphates.

The functionalized polyurethane used as binder resins according to this invention has a weight average molecular weight of from 20,000 to 75,000, preferably from 25,000 to 60,000. It is obtained by the reaction of one or more of the functionalized polyols described above, a chain extender having a molecular weight of less than 1000, and a diisocyanate at a temperature of from about 100° C. to about 270° C. until curing is substantially complete. A temperature of about 120° C. for a time of about 90 is suitable. The ratio of isocyanate group to hydroxyl group is in the range of 1:2 to 1:1. Said ratio is a factor in determining the molecular weight of the resin. When the isocyanate content is too large, the resulting polyurethane is isocyanate-terminated and has a poor storage life. When the hydroxyl content is too large, the molecular weight decreases. A preferred range is from 1:1 to 1:1.2. The reaction may be carried out in either the molten state or in solution. The poly addition reaction for producing the polyurethane of this invention may be of the one-shot procedure wherein all of the components are reacted at one time, and the prepolymer method wherein a long chain diol is first reacted with excess isocyanate and the resulting isocyanate-terminated prepolymer is polymerized using a chain extender. The block polymer method is a variation on the prepolymer method wherein another long chain hydroxyl group containing compound is reacted with the isocyanate-terminated prepolymer. Stannous octylate, stannous oxalate, dibutyltin dilaurate, triethylamine, and the like may be used as a catalyst. To prevent gelation of the polyurethane, p-toluenesulfonic acid, or an inorganic acid may be used. Ultraviolet light absorbers, hydrolysis inhibitors, antioxidants, and other useful additives may be added before, during, or after the production of the polyurethane. The polyurethane may be a segmented block or random copolymer comprising a hard segment and a soft segment. The functional group having FORMULA I may be incorporated into the soft segment by including one of the aminodiols named above in the mixture of glycols used in the reaction with a dicarboxylic acid to make the polyesterdiol, thence the polycaprolactonediol, or the reaction with a dialkyl carbonate to make a polycarbonatediol and then reacting the resulting amino group-containing polyol with one of the Brønsted acids mentioned above. It is preferred to use the Brønsted acid salt of an carboxylic acid terminated aminoester, as described above, in the preparation of the polyurethane.

The chain extender has the effect of regulating the urethane group content of the polyurethane resin to impart toughness to the resin. Examples of the chain extender include bifunctional to tetrafunctional polyols having a molecular weight of about 500 or less, particularly straight chain glycols such as ethylene glycol; 1,3-propylene glycol; 2-methyl-1,3-propane diol; 2-butyl-2-ethyl-1,3-propane diol; 1,4-tetramethylene glycol; 1,6-hexanediol, cyclohexanedimethanol, xylylene glycol, diethylene glycol; triethylene glycol; and an ethylene oxide adduct of bisphenol A; branched chain glycols such as propylene glycol; neopentyl glycol; 1,2-butanediol; 1,3-butanediol; 2,2,4-trimethyl-1,3-pentanediol; and a propylene oxide adduct of bisphenol A; water; aminoalcohols such as monoethanolamine and N-methylethanolamine; diamines such as ethylene diamine, hexamethylene diamine, and isophorone diamine are suitable in some instances, but to avoid crosslinking, secondary diamines such as N, N'-dialkyl phenylenediamine, and p, p'-di(alkylamino) diphenylmethane, sold under the trademark Unilink by UOP, and piperazine and the like are preferred. The amount of chain extender is determined in part by the size and nature of the chain extender and in part by the desired properties. Trifunctional chain extenders such as trimethylolpropane, diethanolamine, triethanolamine, and glycerin may also be used with care as to their effect on the performance characteristics of the polyurethane.

The diisocyanate is exemplified by 2,4-tolylene diisocyanate; 2,6-tolylenediisocyanate; p-phenylenediisocyanate; diphenylmethanediisocyanate or MDI; m-phenylene diisocyanate; hexamethylenediisocyanate; tetramethylenediisoacyanate; 3,3'-dimethoxy-4,4'-biphenylenediisocyanate; 2,4-naphthalene diisocyanate;3,3'-dimethyl-4,4'-biphenylenediisocyanate; 4,4'diphenylenediisocyanate; 4,4'-diisocyanate-diphenyl ether, 1,5-naphthalenediisocyanate; p-xylylenediisocyanate; m-xylylene diisocyanate; 1,3-diisocyanatomethylcyclohexane; 1,4-diisocyanatomethylcyclohexane; 4,4'-diisocyanatodicyclohexane; 4,4'-diisocyanatodicyclohexylmethane; isophorone diisocyanate, and the like. Triisocyanates, such as 2,4-tolylenediisocyanate trimer and hexamethylenediisocyanate trimer and the like, are also used with care as to their effect on the performance characteristics of the polyurethane.

The ferromagnetic particles used in the coating composition of the present invention include magnetic metal powders, $\gamma$-$Fe_2O_3$, $\gamma$-$Fe_2O_3$/$Fe_3O_4$ mixed crystal, $CrO_2$, cobalt ferrite, barium ferrite, cobalt containing iron oxide, and ferromagnetic alloy powders such as Fe-Co, Fe-Co-Ni, pure iron, surface-treated iron (e.g., Fe-Co-Co-Ni, Fe-Co-Ni, Fe-Co-B, Fe-Co-Cr-B, Mn-Bi, Mn-Al, Fe-Co-V), iron nitride and other similar magnetic particles.

A solvent is generally used in the production of a magnetic coating composition of this invention. Ketones such as methyl ethyl ketone, methyl isobutyl ketone, and cyclohexanone; esters such as methyl acetate, ethyl acetate, and ethyl butyrate; and xylene; and mixtures of two or more of the preceding solvents are examples of those that are useful. Further, exemplary solvents usable for the preparation of the magnetic coating formulation include the acetate esters of glycol ethers, e.g., ethylene glycol monoethyl ether acetate and propylene glycol monomethyl ether acetate; aromatic hydrocarbons, e.g., benzene, toluene and xylene; nitropropane; tetrahydrofuran; dimethylacetamide; and dimethylformamide and mixtures thereof.

A variety of materials conventionally known as additives for magnetic coating formulations can be suitably used, such as plasticizers, lubricants, abrasives, dispersants, antistatic agents and fillers. Dibutyl phthalate and triphenyl phosphate exemplify the plasticizers. Dioctyl-sulfosodium succinate, t-butylphenol polyethylene ether, sodium ethylnaphthalenesulfonate, dilauryl sulfate, zinc stearate, soybean oil lecithin, myristic acid, butyl myristate and silicone oil exemplify the lubricants and antistatic agents.

The functionalized polyurethane contains a sufficient amount of the tertiary aminodiol residue which furnishes the cation of the functional group of FORMULA I to yield a binder having a Brønsted acid salt concentration of from about 8 to about 32, preferably from about 10 to about 20, gram equivalents per $1 \times 10^6$ grams of polyurethane. The very high solution viscosity of functionalized polyurethanes of similar molecular weight in the prior art, caused by high functional group levels, makes them very difficult to handle. The functionalized polyurethane of this invention provides dispersions of magnetic particles offering good dispersibility, adsorptivity, and low viscosity. It also provides good hydrolytic stability. Accordingly, this novel polyurethane can be used advantageously as a dispersing binder for advanced recording media using high surface area pigments and magnetic particles.

The magnetic recording medium of this invention comprises a non-magnetic support and a magnetic coating containing magnetic particles dispersed in the novel highly dispersive binder of this invention. Material for the support includes polyesters, polypropylene, cellulose triacetate, polycarbonate, poly(vinylchloride), and aluminum. Examples of suitable films of polyethylene terephthalate are described in U.S. Pat. Nos. 4,454,312; 4,595,715; and 4,693,932.

Among the devices for dispersing the components of the magnetic coating composition there may be mentioned a twin roll mill, a ball mill, a pebble mill, vertical and horizontal sandmills and a high speed stone mill.

Methods for coating are exemplified by the knife coating, wire bar coating, doctor blade coating, reverse roll coating, and calendar coating methods. After the magnetic coating has been coated onto the non-magnetic support surface, the coated film is generally subjected before drying to an orientating treatment in a magnetic field and to a smoothing treatment. The magnetic coating layer is from about 1 micron to about 12 microns thick and provides a magnetic field of from about 600 to about 5000 gauss.

The binder resin of the present invention becomes a uniform resin superior in dispersibility of the magnetic particles by virtue of the incorporation of the amount prescribed above of the Brønsted acid salt of FORMULA I in the soft segment. As a result, the magnetic recording medium of this invention is superior in the filling characteristics and orientation of the magnetic particles and the smoothness of the magnetic layer of the recording medium.

The binder resins, magnetic coating composition, and magnetic recording medium of this invention are illustrated specifically in the following examples wherein all parts are parts by weight unless otherwise indicated.

EXAMPLE 1

A mixture of 169 parts of deionized water, 10.0 parts of IRGANOX 1076 antioxidant, 27.6 parts (0.1264 mole) of N,N-dimethyl-N',N'-di-(2-hydroxypropyl)-1,3 propane diamine, and 1169.2 parts (8.0 moles) of adipic acid was heated at a temperature of 170–180° C. in a reaction vessel equipped with a distillation column to drive off water as it was formed by the condensation reaction. Nine parts (0.078 mole) of concentrated phosphoric acid were added slowly to the carboxylic acid terminated ester and the mixture was stirred for 0.5 hour. Cyclohexanedimethanol, 1873.29 parts (13.0 moles) was added and the mixture was heated at 170–180° C. under reduced pressure for two hours. FASCAT 2001 catalyst, 0.75 part, was added and the reaction was continued at a reduced pressure of about 5–10 mm Hg for two hours to attain an acid number of less than 13 and an OH number of about 200 to form a functionalized polyesterdiol which is useful as an intermediate for this invention.

EXAMPLE 2

The functionalized polyesterdiol of Example 1 (49.30 parts) was mixed with 40.34 parts of an adipic acid/1,4-butanediol polyesterdiol having an OH number of 198 and 10.36 parts of 2-butyl-2-ethyl-1,3-propanediol (BEPD). This mixture was then heated with 55.93 parts of diphenyl-methanediisocyanate (MDI) to yield a functionalized polyurethane of this invention containing 10 gram moles of the phosphoric acid salt of the aminodiol residue in the soft segment per $1 \times 10^6$ grams of the polyurethane.

EXAMPLE 3

A first binder solution containing 289.85 parts of the vinyl chloride copolymer containing sodium sulfonate groups (sold under the trademark UC 569 by Union Carbide) in a solvent consisting of 547.5 parts each of methylethyl ketone (MEK), cyclohexanone (CHO), and toluene was prepared for use in the millbase having the formulation shown in Table 1.

TABLE 1

| COMPONENT | WEIGHT |
|---|---|
| Iron oxide LX-313 | 3000.0 |
| Carbon black | 100.0 |
| Aluminum oxide | 60.0 |
| MEK | 876.33 |
| CHO | 876.33 |
| Toluene | 876.33 |
| Myristic acid | 45.0 |
| Binder Solution | 1932.35 |

The millbase density was 1.32 grams/cc.

A letdown solution of 289.85 parts of a polyurethane of this invention made according to the general procedure of Example 2 was made by dissolving it in 1642.5 parts of a solvent made up of equal parts of MEK, CHO, and toluene. To this there were added 45.0 parts of butyl myristate and 620.49 parts each of said MEK, CHO, and toluene mixture.

Seven hundred and seventy (770) parts of the millbase and 381 parts of the letdown solution are mixed for five minutes in an air driven mixer with a propeller and this is then milled in a 250 ml BYK SL horizontal sand mill for 20 minutes at a shaft speed of 3000 rpm to give a magnetic recording composition of this invention.

The subject matter claimed is:

1. A magnetic recording medium comprising a non-magnetic support and a magnetic coating thereon, said coating comprising a binder resin and magnetic particles dispersed therein, said binder resin comprising a polyurethane incorporating at least one functionalized polyol selected from the group consisting of a polyesterdiol, a polyetherdiol, a polycaprolactone diol, and a polycarbonate diol, which polyol incorporates a functional group having the formula:

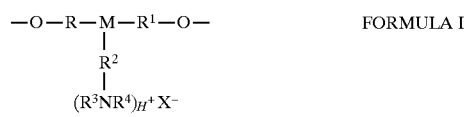

FORMULA I wherein M is a methylene group or nitrogen, R and $R^1$ are the same or different alkylene groups having from 1 to 7 carbon atoms, $R^2$ is an alkylene group having from 1 to 7 carbon atoms, and $R^3$ and $R^4$ are the same or different alkyl groups having from 1 to 7 carbon atoms, and X is an anion of a Brønsted acid in an amount such that the polyurethane contains from about 8 to about 32 gram moles of the functional group per $1\times10^6$ grams of the polyurethane.

2. The magnetic recording medium of claim 1 wherein R and $R^1$ are propylene groups.

3. The magnetic recording medium of claim 2 wherein $R^2$ is a propylene group.

4. The magnetic recording medium of claim 3 wherein $R^3$ and $R^4$ are alkyl groups.

5. The magnetic recording medium of claim 4 wherein the amount of the functional group is from about 10 to about 20 gram moles per $1\times10^6$ grams of polyurethane.

6. The magnetic recording medium of claim 4 wherein the Brønsted acid is phosphoric acid.

7. The magnetic recording medium of claim 3 wherein the amount of the functional group is from about 10 to about 20 gram moles per $1\times10^6$ grams of polyurethane.

8. The magnetic recording medium of claim 3 wherein the Brønsted acid is phosphoric acid.

9. The magnetic recording medium of claim 8 wherein the amount of the functional group is from about 10 to about 20 gram moles per $1\times10^6$ grams of polyurethane.

* * * * *